US011799375B2

(12) United States Patent
Neuhaeusler et al.

(10) Patent No.: US 11,799,375 B2
(45) Date of Patent: Oct. 24, 2023

(54) POWER CONVERTER FEEDBACK

(71) Applicant: TEXAS INSTRUMENTS INCORPORATED, Dallas, TX (US)

(72) Inventors: Juergen Neuhaeusler, Rosenheim (DE); Tanvee Shailesh Pandya, Pulling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 31 days.

(21) Appl. No.: 17/138,525

(22) Filed: Dec. 30, 2020

(65) Prior Publication Data

US 2021/0218335 A1 Jul. 15, 2021

Related U.S. Application Data

(60) Provisional application No. 62/960,511, filed on Jan. 13, 2020.

(51) Int. Cl.
*H02M 3/158* (2006.01)
*H02M 1/00* (2006.01)

(52) U.S. Cl.
CPC ....... *H02M 3/1582* (2013.01); *H02M 1/0025* (2021.05); *H02M 1/0003* (2021.05)

(58) Field of Classification Search
CPC .......................................... H02M 3/155–1588
See application file for complete search history.

(56) References Cited

U.S. PATENT DOCUMENTS

| | | | | |
|---|---|---|---|---|
| 4,013,939 A | * | 3/1977 | Biess | H02M 3/156 323/286 |
| 4,514,679 A | * | 4/1985 | Schierjott | H02M 3/1563 323/222 |
| 2008/0061750 A1 | * | 3/2008 | Stoichita | H02M 3/1563 323/271 |
| 2010/0027301 A1 | * | 2/2010 | Hoyerby | H03F 3/19 363/39 |
| 2015/0378378 A1 | * | 12/2015 | Zhang | H02M 1/4225 323/280 |
| 2021/0273553 A1 | * | 9/2021 | Nosaka | H02M 3/1586 |
| 2021/0336524 A1 | * | 10/2021 | Huang | H02M 1/0012 |

\* cited by examiner

*Primary Examiner* — Peter M Novak
(74) *Attorney, Agent, or Firm* — Charles F. Koch; Frank D. Cimino

(57) ABSTRACT

A circuit comprises a controller configured to receive an input voltage and control a power converter to provide an output voltage based on the input voltage. The controller is also configured to receive a feedback voltage from a split feedback divider, the feedback voltage based on the output voltage and control the power converter to provide the output voltage based on the input voltage and the feedback voltage.

17 Claims, 3 Drawing Sheets

POWER CONVERTER FEEDBACK

CROSS-REFERENCE TO RELATED APPLICATION

This application claims priority to U.S. Provisional Patent Application No. 62/960,511, filed Jan. 13, 2020, which is hereby incorporated herein by reference in its entirety.

BACKGROUND

A switched mode power supply (SNIPS) transfers power from an input power source to a load by switching one or more power transistors or other switching elements coupled through a switch node/terminal to an energy storage element (such as an inductor, an inductance of a transformer, and/or a capacitor), which is capable of coupling to the load. The power transistors can be included in a power converter that includes, or is capable of coupling to, the energy storage element. A SMPS can include a SMPS controller to provide one or more gate drive signals to the power transistor(s). Sometimes, tolerances for variance in an output voltage of the SNIPS are small, such as when the load is noise sensitive or includes at least some components that are noise sensitive.

The input voltage to the converter may be greater than, less than or equal to the output voltage. If the input voltage is greater than the output voltage, the converter may be referred to as a "step-down" converter/regulator or a "buck converter." If the input voltage is less than the output voltage, the converter/regulator may be referred to as a "step-up" converter/regulator or a "boost converter." If the converter/regulator can perform both step-up and step-down functions, then it may be referred to as a "buck-boost converter."

SUMMARY

A circuit comprises a controller configured to receive an input voltage and control a power converter to provide an output voltage based on the input voltage. The controller is also configured to receive a feedback voltage from a split feedback divider, the feedback voltage based on the output voltage and control the power converter to provide the output voltage based on the input voltage and the feedback voltage.

A circuit comprises a first capacitor having first and second plates, the first capacitor first plate adapted to be coupled to a first terminal. The circuit also comprises a second capacitor having first and second plates, the second capacitor first plate coupled to the first capacitor second plate and the second capacitor second plate adapted to be coupled to ground. The circuit also comprises a first resistor having first and second terminals, the first resistor first terminal adapted to be coupled to a second terminal. The circuit also comprises a second resistor having first and second terminals, the second resistor first terminal coupled to the first resistor second terminal and to the second capacitor first plate, and the second resistor second terminal adapted to be coupled to ground.

A system comprises a load, a switched mode power supply (SMPS), a filter, and a split feedback divider. The SMPS has a switch terminal and a SMPS feedback input. The filter has a filter input and a filter output, the filter input adapted to be coupled through an energy storage element to the switch terminal of the SMPS, and the filter output adapted to be coupled to the load. The split feedback divider has a split feedback divider output, a split feedback divider first input, and a split feedback divider second input, the split feedback divider first input adapted to be coupled through the energy storage element to the switch terminal of the SMPS, the split feedback divider second input adapted to be coupled to the filter output, and the split feedback divider output adapted to be coupled to the SMPS feedback input.

DETAILED DESCRIPTION

Figure 1:
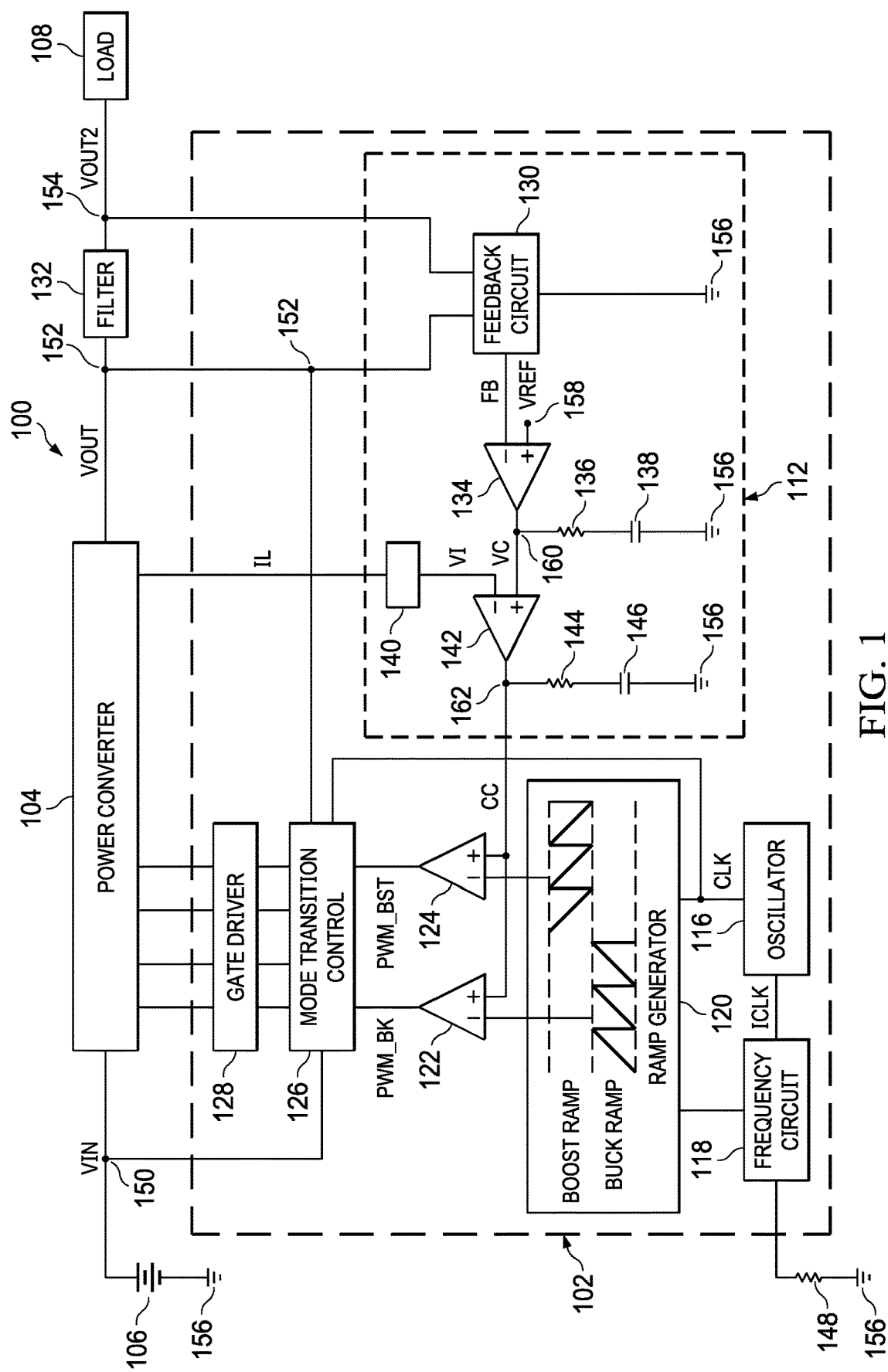
FIG. 1 is a block diagram of an example SMPS.

In some device architectures, a switched mode power supply (SMPS) includes, or is capable of coupling to, an output/bulk capacitor in parallel with the load. A SMPS controller switches power transistor(s) to form circuit arrangements with energy storage element(s) to supply a load current to the load and/or to the output/bulk capacitor to maintain a regulated output voltage. Alternatively, though not shown herein, at least some of the power transistors are instead implemented as passive switches, such as diodes. A power transistor can be coupled through the switch node/terminal to an energy storage inductor during charging and/or discharging switching states of a power converter. In at least some examples, the energy storage inductor is switched by the SMPS controller between charge and discharge switching states to supply inductor current (e.g., current through the energy storage inductor) to the load and to the output/bulk capacitor to maintain the regulated output voltage. As described above, in at least some examples, one or more of the power transistors are replaced by passive switches that react based on characteristics of a received input signal and are not switched by the SMPS controller. In some examples, a SMPS can be configured for operation as a constant current source with an energy storage element but with no output/bulk capacitor. Power converters periodically repeat sequences of switching states (such as "on" and "off" states). A single on/off cycle may be called a switching cycle.

The power transistors can be implemented as field effect transistors (FETs), such as metal-oxide field effect transistors (MOSFETs) or any other suitable solid-state transistor devices (e.g., such as bipolar junction transistors (BJTs)). Power converters can be of various architectures, each having certain functionality, such as buck, boost, and buck-boost, among others. Depending on the application that a buck-boost converter is used in, the input voltage (VIN) and/or the output voltage (VOUT) of the power converter may vary. To address this, the SMPS controller will control the buck-boost converter to operate in different modes of operation. For example, based on VIN being greater than VOUT, the SMPS controller will cause the power converter to operate in a buck mode of operation. Based on VIN being less than VOUT, the SMPS controller will cause the power converter to operate in a boost mode of operation. Based on VIN being approximately equal to VOUT, the SMPS controller will cause the power converter to operate in a buck-boost mode of operation, or in alternate cycles of buck-mode and boost-mode operation. The above examples are non-exclusive and apply generally to a power converter of buck-boost topology or architecture. However, at least some of the above examples also apply to power converters of other topologies or architectures, such as buck or boost, operating under certain modes of control.

To control a mode of operation of the power converter, the SMPS controller provides gate control signals to one or more power transistors of the power converter. The gate control signals received by a power transistor control whether the power transistor is in a conductive state (e.g., turned on) or in a non-conductive state (e.g., turned off). Each state of a power converter involves a specific combination of transistors that are in conducting states and transistors that are in non-conducting states. To change a mode of operation of the power converter, the SMPS controller modifies the sequence of switching states that it commands the transistors to assume. In at least some examples, the SMPS controller implements a state machine or other logic such that values of the gate control signals are determined based on a mode of operation of or for the power converter. Also, while remaining in a mode of operation of the power converter, the SMPS controller may modify a value of one or more of the gate control signals, such as to alternatively turn on and turn off one or more power transistors.

Some use cases for a SMPS benefit from a reduced variance in a value of VOUT. For example, various aspects of operation of the SMPS can create noise in VOUT. Noise, as used herein, is a disturbance in a value of VOUT from a programmed value of the SMPS for VOUT. Noise can be created by the switching of the power transistors of the SMPS, external factors such as electromagnetic interference or magnetic fields, the charging and/or discharging of energy storage elements, characteristics of interconnects, wires, electrical traces, etc., or any other source that causes disturbance in the value of VOUT. Generally, the presence of noise in VOUT is an accepted factor of use of the SMPS and attempts are made through hardware structures, or control processes, to reduce a value of the noise to the extent possible. As described above, some use cases for the SMPS may benefit more than others from a reduced variance in the value of VOUT. Said another way, some use cases for the SMPS may be more sensitive to the presence of noise in VOUT than other use cases. For example, noise in VOUT that has a certain value may adversely affect operation of a load that receives VOUT including the noise. In such examples, efforts may be taken to reduce the noise, such as by filtering VOUT as provided by a power converter prior to the SMPS providing VOUT to a load. However, placing a filter in an output path of the SMPS between the power converter and the load can cause a value of VOUT to be reduced. Such a reduction may result at least in part from an impedance of components of the filter that are placed in the output path of the SMPS. Thus, while potentially reducing an amount of noise in VOUT, a value of VOUT itself may also be disadvantageously reduced, which can in turn create further challenges in use cases that have small tolerances for variation in VOUT. At least some of these use cases, or application environments, that are noise sensitive or may benefit from a reduced variance in VOUT resulting from noise may include analog-to-digital converters, radar systems, and/or high-speed data communication circuits (such as Ethernet physical interfaces).

At least some aspects of this description relate to an architecture of, or for, a feedback circuit, such as is suitable to be, or is, implemented in a SMPS. Other aspects of this description relate to a method for generating VOUT. At least some examples of the feedback circuit include components for controlling both alternating current (AC) and direct current (DC) feedback components in the SMPS. The feedback circuit is configured to compensate in the SMPS for the effects of a filter in the output path of the SMPS between the power converter and the load such that, despite an impedance of the filter, VOUT maintains a value approximately equal to a value for which the SMPS is programmed to provide VOUT. In at least some examples, the feedback circuit includes a capacitor divider coupled between an output of the power converter and ground, and a resistor divider coupled between an output of the filter and ground. A common point of the resistor divider is coupled to a common point of the capacitor divider, which is a point from which a feedback signal (FB) is provided to the SMPS for use in generating VOUT at the programmed value. In such an architecture, the capacitor divider controls AC performance of the feedback circuit and the resistor divider controls a DC operating point of the feedback circuit.

FIG. 1 shows a block diagram of an example SMPS 100. In at least one example, the SMPS 100 includes a controller 102 and a power converter 104. The SMPS 100, at least through the power converter 104, switches power provided based on a power source 106 from a node 150 to a load 108. In some examples, the power converter 104 is a buck-boost power converter that is capable of operating according to a buck mode of operation, a boost mode of operation, and/or a buck-boost mode of operation. In other examples, the power converter 104 is a buck power converter or a boost power converter. In at least one example, the controller 102 includes, or is adapted to be coupled to, a control loop 112, an oscillator 116, a frequency circuit 118, a ramp generator 120, a comparator 122, a comparator 124, a mode transition control circuit 126, and a gate driver 128. The SMPS 100 of this description is shown and described as implementing average current mode control over the power converter 104. However, other control methods are possible, such as peak current mode control, valley current mode control, voltage mode control, or any other suitable form of control implemented in a fixed frequency or variable frequency system.

At least one example of the SMPS 100 includes at least some aspects of the controller 102 and the power converter 104 on a same semiconductor die and/or in a same component package (or encapsulation), while in other examples the controller 102 and the power converter 104 may be fabricated separately and adapted to be coupled together. For example, at least some aspects of the controller 102 may be fabricated separately and coupled together. Accordingly, while shown as including the gate driver 128, in at least one example the controller 102 does not include the gate driver 128 and instead is adapted to be coupled to the gate driver 128. Similarly, other components shown as being included in the controller 102 may instead be adapted to be coupled, in whole or in part, to the controller 102 and not be included on a same semiconductor die and/or in a same component package as the controller 102. For example, at least some components of the control loop 112 may not be included in the controller 102 such that the controller 102 is instead adapted to be coupled to these components. Similarly, components shown or described in this description as being included in the power converter 104 (such as an inductor) may instead be adapted to be coupled, in whole or in part, to the power converter 104 and not be included on a same semiconductor die and/or in a same component package as the power converter 104.

In at least one example, the control loop 112 includes a feedback circuit 130 coupled between a node 152 and ground 156, as well as between a node 154 and ground 156. The control loop 112 further includes an amplifier 134 having a first input (e.g., a non-inverting input) coupled to a node 158 and configured to receive a reference voltage (VREF) at the node 158. The amplifier 134 further has a second input (e.g., an inverting input) coupled to an output of the feedback circuit 130 and adapted to receive FB from the feedback circuit 130. The amplifier 134 also has an output coupled to a node 160. FB is provided by the feedback circuit 130 to the amplifier 134 and is a scaled representation of VOUT, modified based on the filter 132. A signal (VC) is provided at the node 160 by the amplifier 134 based on a difference between VREF and FB. A resistor 136 is coupled between the node 160 and a top plate of a capacitor 138 and a bottom plate of the capacitor 138 is coupled to ground 156. The control loop 112 further includes a current sense circuit 140 and an amplifier 142. The current sense circuit 140 is adapted to be coupled to the power converter 104 to provide an output signal (VI) that is a voltage representation of a current flowing through the power converter 104. The amplifier 142 has a first input (e.g., a positive or non-inverting input) coupled to the node 160, a second input (e.g., a negative or inverting input) coupled to an output of the current sense circuit 140, and an output coupled to a node 162. A current control signal (CC) is provided at the node 162 by the amplifier 142 based on a difference between VC and VI. A resistor 144 is coupled between the node 162 and a top plate of a capacitor 146 and a bottom plate of the capacitor 146 is coupled to ground 156.

The oscillator 116, in at least some examples, is any component or components suitable for generating a clock signal, shown in FIG. 1 as CLK. A frequency of CLK is determined, in at least some examples, based on a value of a signal received from the frequency circuit 118. For example, the frequency circuit 118 provides a current signal, shown in FIG. 1 as ICLK, based at least partially on a value of a resistor 148 coupled to the frequency circuit 118. The frequency circuit 118 provides ICLK to the oscillator 116 to enable the oscillator 116 to provide CLK at least partially according to ICLK. In at least some examples, the frequency circuit 118 further provides ICLK to the ramp generator 120. The oscillator 116 provides CLK to, in some examples, the ramp generator 120 and the mode transition control circuit 126.

The ramp generator 120, in at least some examples, is any component or components suitable for generating buck and boost ramp signals for use in controlling the power converter 104. In at least some examples, the buck and boost ramp signals are provided by charging and resetting (e.g., discharging) one or more capacitors (not shown) at a specified rate of charge, specified by a current value of a signal charging the one or more capacitors. In at least some examples, based on the received CLK and ICLK signals, the ramp generator 120 provides the buck ramp signal and the boost ramp signal.

The comparator 122 includes a first input (e.g., a positive or non-inverting input) coupled to the node 162, a second input (e.g., a negative or inverting input) coupled to the ramp generator 120 and configured to receive the buck ramp signal from the ramp generator 120, and an output. The comparator 124 includes a first input (e.g., a positive or non-inverting input) coupled to the node 162, a second input (e.g., a negative or inverting input) coupled to the ramp generator 120 and configured to receive the boost ramp signal from the ramp generator 120, and an output. In at least some examples, a control signal, shown in FIG. 1 as PWM_BK, exists at the output of the comparator 122 and a control signal, shown in FIG. 1 as PWM_BST, exists at the output of the comparator 124. In some examples, PWM_BK has an asserted value responsive to CC being greater in value than the buck ramp and a de-asserted value responsive to CC being less in value than the buck ramp. Similarly, in some examples, PWM_BST has an asserted value responsive to CC being greater in value than the boost ramp and a de-asserted value responsive to CC being less in value than the boost ramp.

The mode transition control circuit 126 has inputs configured to receive at least CLK, PWM_BK, PWM_BST, VOUT, and VIN (sometimes collectively referred to with respect to the mode transition control circuit 126 as the received signals). In at least some examples, the mode transition control circuit 126 includes or implements a state machine to provide one or more control signals for controlling the power converter 104 according to the received signals. Operation of the mode transition control circuit 126 is described in greater detail below.

In at least one example, the SMPS 100 is configured to receive VIN from the power source 106 at the node 150 and provide VOUT at the node 152, such as for supplying the load 108. VOUT is based at least partially on VIN as provided at the node 150 and VREF as received by the SMPS 100 at the node 158. VREF may be received from any suitable device (not shown) such as a processor, microcontroller, or any other device exerting control over the SMPS 100 to control a value of VOUT. In at least one example, VREF has a value representative of a specified (e.g., user-specified, target, preconfigured, programmed, etc.) value of FB. Based on a variance in value of VREF from FB, the controller 102 controls the power converter 104 to modify VOUT to cause FB to more closely match VREF. In at least some implementations, the controller 102 receives one or more signals from the power converter 104. For example, the controller 102 may receive VOUT from the power converter 104 and/or an inductor current (IL) of the power converter 104. In various examples, IL may be a value directly detected, measured, or sensed from an inductor (not shown) of the power converter 104 (or another component of the power converter 104 to which the inductor is also coupled). In at least one example, IL is provided to the control loop 112 for generation of VI and VOUT is provided to the control loop 112 and the mode transition control circuit 126. VI is provided based on IL, in at least some examples, by the current sense circuit 140. The current sense circuit 140 is, in some examples, a resistor.

In at least one example, the control loop 112 is configured to receive VREF and VOUT (which leads to the generation of FB) and provide VC indicating a variation in FB from VREF. VC is referred to in some examples as an error signal. In at least some examples, FB is an output of the feedback circuit 130, where an input to the voltage divider is VOUT. VC is subsequently filtered by the resistor 136 and the capacitor 138 before being received by the amplifier 142. The amplifier 142, in at least one example, is configured to receive VC and VI and provide CC indicating a variation in VI from VC. CC is subsequently filtered by the resistor 144 and the capacitor 146 before being received by the comparator 122 and the comparator 124.

As described above, in at least one example, the frequency circuit 118 provides and provides a signal ICLK based on a resistance of the resistor 148. ICLK at least partially determines a frequency of a clock signal CLK provided and provides by the oscillator 116.

The mode transition control circuit 126 provides one or more control signals for controlling the gate driver 128 to control the power converter 104. While shown in FIG. 1 as generating and providing four control signals to the gate driver 128, such is merely one example of signals with respect to the mode transition control circuit 126. In at least one example, the mode transition control circuit 126 includes or otherwise implements a state machine (either digital or analog) to provide the control signals based on values of CLK, PWM_BK, PWM_BST, VOUT, and/or VIN.

Based on the control signals received from the mode transition control circuit 126, the gate driver 128 provides one or more gate control signals for controlling power transistors of the power converter 104, as described above. While shown in FIG. 1 as generating and providing four gate control signals to the power converter 104, such is merely one example of signals with respect to the mode transition control circuit 126. For example, the gate driver 128 provides gate control signals that alternatingly, and selectively, turn the power transistors of the power converter 104 on and off to energize and de-energize elements such as an inductor and/or a capacitor (each not shown). This energizing and de-energizing provides the buck, boost, and/or buck-boost functionality described herein. The gate driver 128 is implemented according to any suitable architecture, the scope of which is not limited herein.

As described above, in at least some examples, the load 108 may be sensitive to the presence of noise in VOUT. For example, VOUT including noise over a threshold amount may adversely or negatively affect operation of the load 108. To mitigate the effects of noise in VOUT, the SMPS 100 may include, or be adapted to be coupled to, a filter 132 between an output of the power converter 104 and the load 108. The filter 132 may provide VOUT2 based on filtering VOUT, and VOUT2 may be provided to the load 108. As described above, a value of VOUT2 may be reduced from that of VOUT based at least in part on an impedance of the filter 132. The reduction in value caused by the filter 132 may be current dependent. Therefore, while the SMPS 100 provides and/or regulates VOUT according to VREF and FB, VOUT2 may be considered in some regards to be unregulated because the SMPS 100 does not directly control a value of VOUT2. Thus, it may be challenging for the SMPS 100 to provide fixed compensation to increase a value of VOUT such that VOUT2 has a value corresponding to VREF (e.g., VOUT2 has a value approximately equal to a value for which the SMPS 100 is programmed based on the value of VREF).

To enable the SMPS 100 to at least partially compensate in a value of VOUT for a reduction in value of VOUT by the filter 132 in providing VOUT2, the feedback circuit 130 is configured to provide FB according to both VOUT and VOUT2. For example, the feedback circuit 130 provide FB having a DC operating point, or gain, determined according to VOUT2 and an AC performance determined according to VOUT. In at least some examples, the DC operating point controls an accuracy of the feedback circuit 130 and the AC performance controls a transient responsiveness (e.g., speed) of the feedback circuit 130.

In at least some examples of the SMPS 100, programmability of the controller 102 is limited. For example, user control of the SMPS 100 to adapt the controller 102 to various operating environments, provide compensation, etc. may be limited to input provided to the controller 102 as FB. In such examples, the controller 102 may have built-in or pre-programmed and unchangeable, or fixed, characteristics such as compensation. In such examples, the controller 102 may not be reprogrammable to compensate for components that are coupled to the SMPS 100, such as the filter 132. For example, implementations of a controller 102 that include flexible, variable, or otherwise programmable characteristics may include a capability to program the controller 102 to compensate for effects such as those described above with respect to the filter 132. However, when the characteristics of the controller 102 are fixed, options for providing compensation for effects such as those described above with respect to the filter 132 may become limited to external solutions. At least some examples of the feedback circuit 130 provide such an external solution. For example, the feedback circuit 130 may be suitable for compensating for effects in VOUT2 of the filter 132 being coupled between an output of the power converter 104 and an input of the load 108. Sometimes, such a controller that includes internal compensation that is not adjustable is called a fully-integrated controller. The fully-integrated controller, in some examples, receives VIN and FB as inputs and provides VOUT as an output. At least some examples of the fully-integrated controller include no further user programmability or control, such that VREF is internally provided by the fully-integrated controller or omitted such that the fully-integrated controller is programmed to provide a single particular VOUT.

Figure 2:
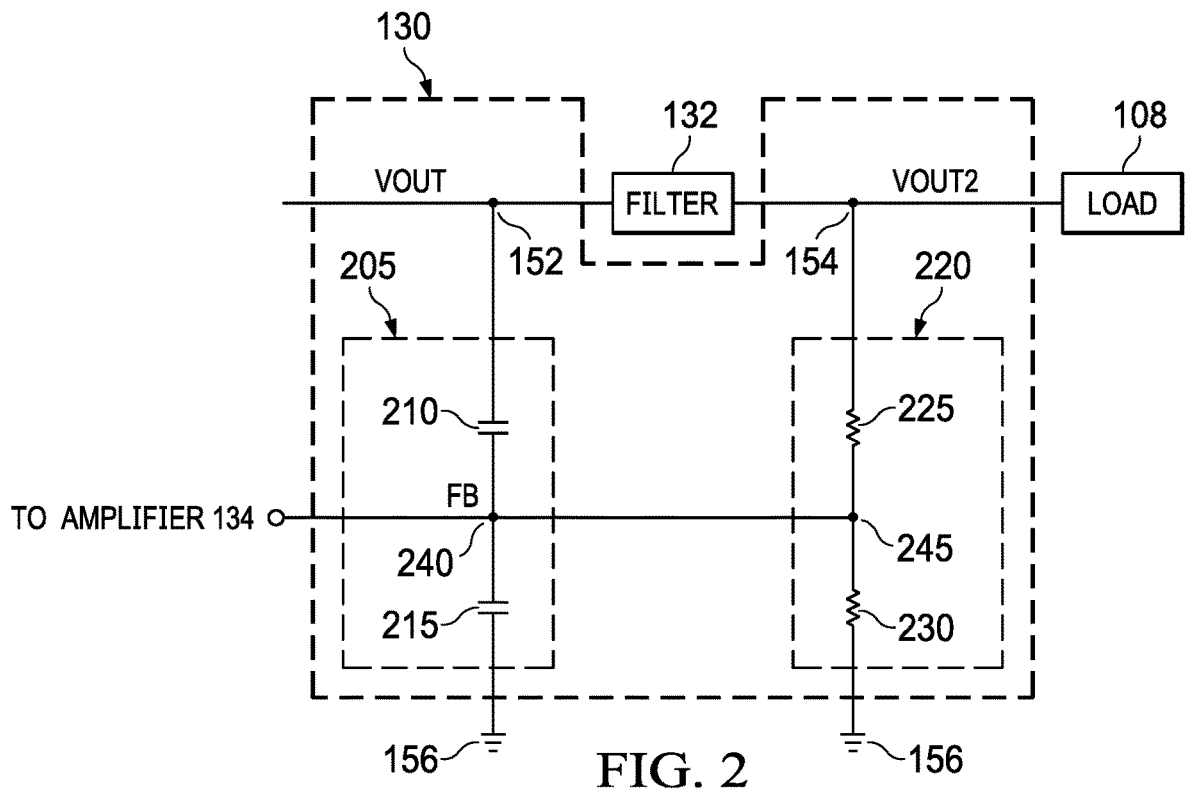
FIG. 2 is a schematic diagram of an example feedback circuit.

FIG. 2 shows a schematic diagram of an example feedback circuit 130. Although FIG. 2 shows one possible architecture for the feedback circuit 130, other architectures are possible and are included within the scope of this description. In at least some examples, the feedback circuit 130 includes a capacitor divider 205 including capacitors 210 and 215 and a resistor divider 220 including resistors 225 and 230.

In an example architecture of the feedback circuit 130, the capacitor divider 205 is adapted to be coupled between the node 152 and ground 156 such that the capacitor 210 is adapted to be coupled between the node 152 and a node 240 and the capacitor 215 is adapted to be coupled between the node 240 and ground 156. The resistor divider 220 is adapted to be coupled between the node 154 and ground 156 such that the resistor 225 is adapted to be coupled between the node 154 and a node 245 and the resistor 230 is adapted to be coupled between the node 245 and ground 156. The resistor divider 220 is adapted to be coupled at the node 245 to the capacitor divider 205 at the node 240. The capacitor divider 205 is adapted to be coupled to a controller, such as the amplifier 134 of the controller 102 at the node 240. For example, in at least some examples of the feedback circuit 130, FB is provided at the node 240. In some examples, the feedback circuit 130 may be referred to as a split feedback divider, with the capacitor divider 205 referred to as an AC divider (for controlling or maintaining response speed) and the resistor divider 220 referred to as a DC divider (for controlling or maintaining accuracy).

In an example of operation of the feedback circuit 130, the capacitor divider 205 is configured to receive VOUT at the node 152 and provide a signal at the node 240 that is determined according to VOUT multiplied by a ratio of a capacitance of the capacitor 210 to a sum of capacitances of the capacitor 210 and the capacitor 215. Similarly, the resistor divider 220 is configured to receive VOUT2 at the node 154 and provide a signal at the node 245 that is determined according to VOUT2 multiplied by a ratio of a resistance of the resistor 230 to a sum of resistances of the resistor 225 and the resistor 230. Based on the value provided by the resistor divider 220 at the node 245, the resistor divider 220 biases the node 240 of the capacitor divider 205 to provide a DC gain. The feedback circuit 130 provides the signal provided at the node 240, as biased based on the node 245, as FB to another component, such as the amplifier 134 for use as described above with respect to FIG. 1.

Figure 3:
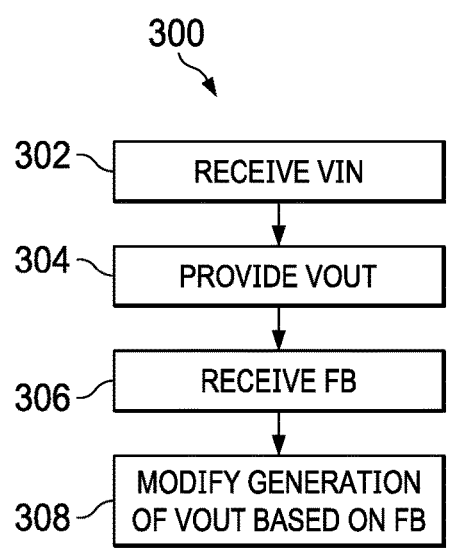
FIG. 3 is a flowchart of an example method.

FIG. 3 shows a flowchart of an example method 300. In at least some examples, the method 300 is a method for providing an output voltage based on an input voltage. At least some examples of the method 300 are implemented by a SMPS, such as the SMPS 100 of FIG. 1.

At operation 302, VIN is received. In various examples, VIN is received from any suitable source, the scope of which is not limited herein. At operation 304, VOUT is provided. VOUT is provided, in at least some examples, as an output signal of a power converter, such as the power converter 104 of FIG. 1. In at least some implementations, VOUT is provided as a function of VIN and FB. At operation 306, FB is received. In some examples, FB is received from a feedback circuit, such as the feedback circuit 130 of FIG. 1. The SMPS may be adapted, or configured, to receive FB from the feedback circuit via a controller, such as the controller 102 of FIG. 1. At operation 308, generation of VOUT is modified based on FB. For example, FB as received at operation 306 is representative of both VOUT and VOUT2, as described above. The SMPS is configured, or adapted, to, via the controller, modify generation of VOUT based on FB.

While the operations of the method 300 described herein have been described and labeled with numerical reference, in various examples, the method 300 includes further operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (such as in a reverse order, substantially simultaneously, overlapping, etc.). Each of these alternatives falls within the scope of this description.

Figure 4:
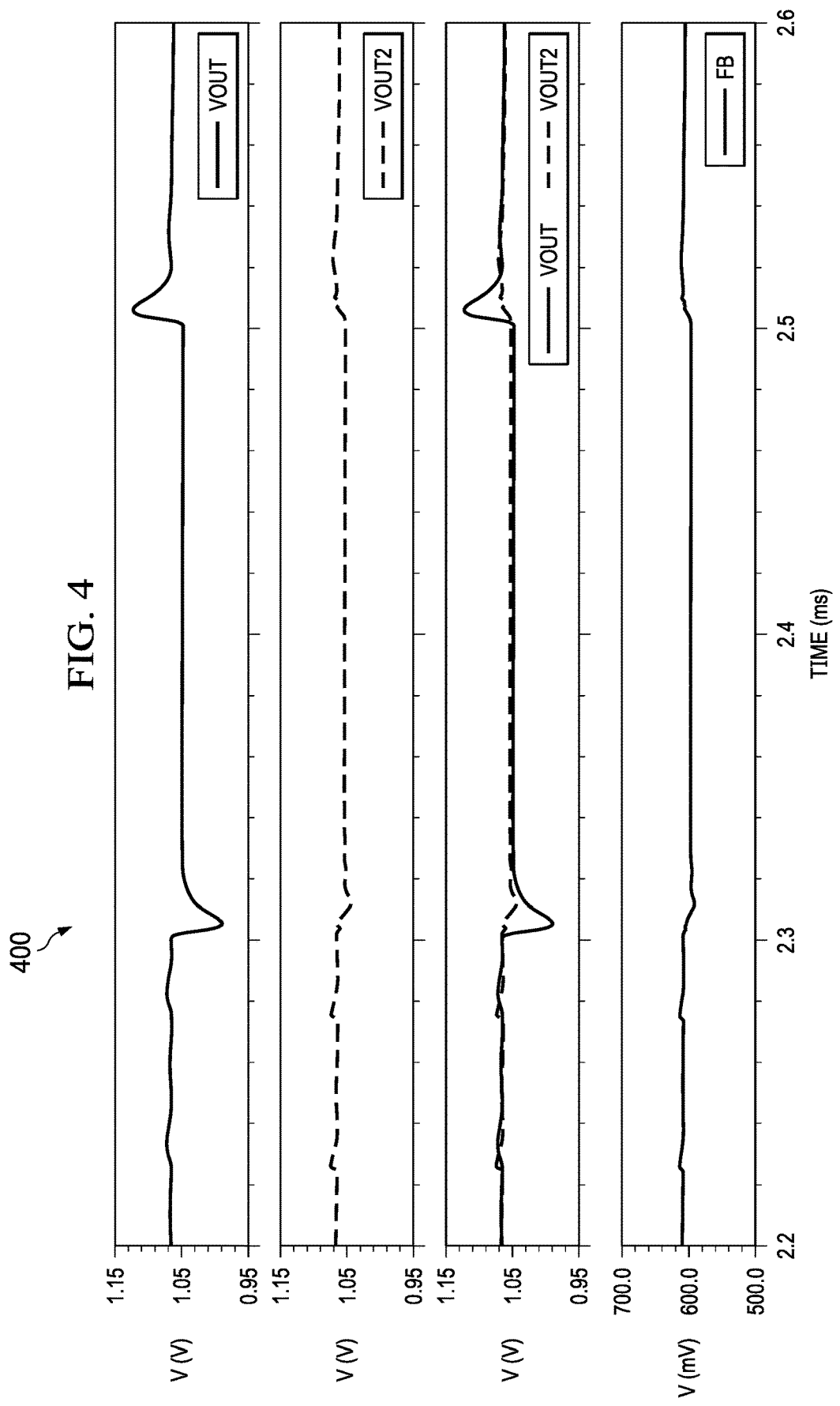
FIG. 4 is a diagram of example signal waveforms.

FIG. 4 shows a diagram 400 of example signal waveforms. The diagram 400 shows signals as may be provided in at least some implementations of the SMPS 100 of FIG. 1 and/or the feedback circuit 130 of FIG. 2. Accordingly, reference may be made to components or signals of these other figures in describing the diagram 400. The diagram 400 shows VOUT, VOUT, and FB, as described above herein. VOUT is shown having a horizontal axis representing time in units of milliseconds (ms) and a vertical axis representing voltage in units of volts (V). VOUT 2 is shown having a horizontal axis representing time in units of ms and a vertical axis representing voltage in units of V. FB is shown having a horizontal axis representing time in units of ms and a vertical axis representing voltage in units of millivolts (mV).

As shown by the diagram 400, VOUT includes ripples that cause a magnitude of VOUT to vary by up to approximately 0.06 V. As described above, some examples of the load 108 may be sensitive to such variation in value of VOUT. To mitigate the ripple in VOUT, the filter 132 filters VOUT to provide VOUT2. As is shown by the diagram 400, the ripples that are present in VOUT are reduced in magnitude, such as to variances of about 0.02 V. The diagram 400 further shows FB. As described above, FB is a combined output of both an AC divider (e.g., a capacitor divider) and a DC divider (e.g., a resistor divider). The AC divider provides for performance of the power converter 104 (e.g., such as providing for sufficiently rapid response to a change in value of VOUT) and the DC divider provides for DC gain such that VOUT2 has a value for which the SMPS 100 and/or controller 102 is programmed to provide to the load 108.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described examples, and other examples are possible, within the scope of the claims.

What is claimed is:
1. A circuit, comprising:
an alternating current (AC) divider coupled between a first power converter input and a ground terminal, the AC divider having a first feedback output and configured to receive a first signal at the first power converter input;

a direct current (DC) divider coupled between a second power converter input and the ground terminal, the DC divider having a second feedback output and configured to receive a second signal at the second power converter input, in which the second signal has a lower voltage than the first signal;
a controller having a feedback input, a reference input, and a power converter control output, the feedback input coupled to the first and second feedback outputs, and the controller configured to:
  receive a feedback signal at the feedback input;
  receive a particular reference signal at the reference input; and
  provide a control signal at the power converter control output responsive to a difference between the particular reference signal and the feedback signal; and
an amplifier having a first input coupled to the power converter, a second input coupled to the power converter control output of the controller, and an output coupled to the power converter.

2. The circuit of claim 1, wherein the AC divider includes a capacitor divider, and the DC divider includes a resistor divider coupled to the AC divider.

3. The circuit of claim 1, wherein the controller is configured to:
  provide a DC component of the feedback signal responsive to the second signal; and
  provide an AC component of the feedback signal responsive to the first signal.

4. The circuit of claim 1, wherein the first power converter input is coupled to an output of a power converter and an input of a filter, and the second power converter input is coupled to an output of the filter, the filter having an impedance between the input and the output; and
  wherein the second signal is a filtered version of the first signal.

5. The circuit of claim 1, wherein the controller has a current sense input and configured to:
  receive a current sense signal; and
  generate a voltage responsive to a current of the power converter.

6. A circuit, comprising:
a feedback circuit having a first feedback input, a second feedback input, and a feedback signal output, the feedback circuit including:
  an alternating current (AC) divider including:
    a first capacitor coupled between the first feedback input and the feedback signal output, the first capacitor configured to receive a first signal at the first feedback input; and
    a second capacitor coupled between the feedback signal output and a ground terminal;
  a direct current (DC) divider including:
    a first resistor coupled between the second feedback input and the feedback signal output, the first resistor configured to receive a second signal at the second feedback input, in which the second signal has a lower voltage than the first signal; and
    a second resistor coupled between the feedback signal output and the ground terminal, wherein the feedback circuit is configured to provide a feedback signal at the feedback signal output responsive to at least one of the first or second signals;
a first amplifier having a first input coupled to the feedback signal output, a second input coupled to a voltage reference, and an output; and
a second amplifier having a first input coupled to a power converter, a second input coupled to the output of the first amplifier, and an output coupled to the power converter.

7. The circuit of claim 6, wherein the first feedback input is coupled to an input of a filter, and the second feedback input is coupled to an output of the filter.

8. The circuit of claim 7, wherein the first feedback input is coupled to an output of a power converter, and the feedback signal output is coupled to a control terminal of the power converter.

9. The circuit of claim 6, wherein the second signal is a filtered version of the first signal.

10. The circuit of claim 6, wherein the AC divider is configured to provide an AC component of the feedback signal, and the DC divider is configured to provide a DC component of the feedback signal.

11. A system, comprising:
a power converter having a voltage input, a voltage output, and a power converter control input, the power converter configured to generate a first signal at the voltage output responsive to a second signal at the voltage input and a control signal at the power converter control input;
a filter having a filter input and a filter output, the filter input coupled to the voltage output, and the filter output coupled to an output terminal, the filter having an impedance between the filter input and the filter output;
an alternating current (AC) divider having a first feedback output, the AC divider coupled between the filter input and a ground terminal;
a direct current (DC) divider having a second feedback output, the DC divider coupled between the filter output and the ground terminal,
a controller having a feedback input, a reference input, and a control output, the feedback input coupled to the first and second feedback outputs, the controller configured to:
  receive a feedback signal at the feedback input;
  receive a particular reference signal at the reference input;
  provide the control signal responsive to a difference between the particular reference signal and the feedback signal; and
an amplifier having a first input coupled to the power converter, a second input coupled to the control output of the controller, and an output coupled to the power converter control input.

12. The system of claim 11, wherein:
the AC divider has a first divider input coupled to the filter input and includes:
  a first capacitor coupled between the first divider input and the first feedback output; and
  a second capacitor coupled between the first feedback output and the ground terminal; and
the DC divider has a second divider input coupled to the filter output and includes:
  a first resistor coupled between the second divider input and the second feedback output; and
  a second resistor coupled between the second feedback output and the ground terminal.

13. The system of claim 12, wherein the AC divider is configured to provide an AC component of the feedback signal, and the DC divider is configured to provide a DC component of the feedback signal.

14. The system of claim 12, wherein the AC divider is configured to receive the first signal at the first divider input, the DC divider is configured to receive a third signal at the second divider input, and the third signal has a lower voltage value than the first signal.

15. The system of claim 11, wherein the power converter has a current sense output; and
   wherein the controller has a current sense input coupled to the current sense output and is configured to:
      receive a current sense signal at the current sense input; and
      generate the control signal responsive to the current sense signal and the difference.

16. The system of claim 11, wherein the power converter is part of a fully-integrated switched mode power supply (SMPS) having a preset internal compensation.

17. The system of claim 16, wherein the particular reference signal is provided internally by the fully-integrated SMPS.

* * * * *